(12) United States Patent
Priyadarshan et al.

(10) Patent No.: US 8,504,419 B2
(45) Date of Patent: Aug. 6, 2013

(54) NETWORK-BASED TARGETED CONTENT DELIVERY BASED ON QUEUE ADJUSTMENT FACTORS CALCULATED USING THE WEIGHTED COMBINATION OF OVERALL RANK, CONTEXT, AND COVARIANCE SCORES FOR AN INVITATIONAL CONTENT ITEM

(75) Inventors: Eswar Priyadarshan, West Roxbury, MA (US); Kenley Sun, Cambridge, MA (US); Dan Marius Grigorovici, Pleasanton, CA (US); Ravikiran Chittari, Acton, MA (US); Jayasurya Vadrevu, Lexington, MA (US); Omar Abdala, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 308 days.

(21) Appl. No.: 12/790,741

(22) Filed: May 28, 2010

(65) Prior Publication Data

US 2011/0295628 A1    Dec. 1, 2011

(51) Int. Cl.
*G06Q 10/00* (2012.01)
(52) U.S. Cl.
USPC ......................................................... 705/14.4
(58) Field of Classification Search
USPC ......................................................... 705/14.4
See application file for complete search history.

(56) References Cited

U.S. PATENT DOCUMENTS

| | | | |
|---|---|---|---|
| 5,408,519 A | | 4/1995 | Pierce et al. |
| 5,459,306 A | * | 10/1995 | Stein et al. .................... 235/383 |
| 5,600,364 A | * | 2/1997 | Hendricks et al. ................ 725/9 |
| 5,613,213 A | | 3/1997 | Naddell et al. |
| 5,636,346 A | * | 6/1997 | Saxe ............................... 705/1.1 |
| 5,678,179 A | | 10/1997 | Turcotte et al. |
| 5,724,521 A | * | 3/1998 | Dedrick ........................ 705/26.1 |
| 5,848,396 A | * | 12/1998 | Gerace .......................... 705/7.33 |
| 5,948,061 A | * | 9/1999 | Merriman et al. ............. 709/219 |
| 5,978,775 A | | 11/1999 | Chen |
| 5,978,833 A | | 11/1999 | Pashley et al. |
| 6,006,197 A | * | 12/1999 | d'Eon et al. ................ 705/14.45 |
| 6,009,410 A | * | 12/1999 | LeMole et al. ............. 705/14.54 |
| 6,012,051 A | * | 1/2000 | Sammon et al. ................ 706/52 |

(Continued)

FOREIGN PATENT DOCUMENTS

| | | |
|---|---|---|
| BE | 1015704 | 7/2005 |
| DE | 19941461 | 3/2001 |

(Continued)

OTHER PUBLICATIONS

AdWords Reference Guide Google, 2004.*

(Continued)

*Primary Examiner* — Scott L Jarrett
(74) *Attorney, Agent, or Firm* — Novak Druce Connolly Bove + Quigg LLP (57) ABSTRACT

Systems and methods are provided for audience targeting based on a performance history of invitational content from secondary content providers, such as advertisements. In operation, responsive to request from a user for content package, a queue of available invitational content is retrieved. Thereafter, based at least on a performance history of the available invitational content in the queue, a context of the primary content, and a performance history of invitational content previously presented to other users, the queue can be at least partially reordered to provide an adjusted queue. The invitational content for the content package can then be selected based on the adjusted queue.

16 Claims, 4 Drawing Sheets

(56) References Cited

U.S. PATENT DOCUMENTS

| | | | |
|---|---|---|---|
| 6,023,700 A | 2/2000 | Owens et al. | |
| 6,055,512 A | 4/2000 | Dean et al. | |
| 6,055,513 A * | 4/2000 | Katz et al. | 705/26.41 |
| 6,057,872 A | 5/2000 | Candelore | |
| 6,085,229 A * | 7/2000 | Newman et al. | 709/203 |
| 6,097,942 A | 8/2000 | Laiho | |
| 6,119,098 A * | 9/2000 | Guyot et al. | 705/14.61 |
| 6,161,127 A * | 12/2000 | Cezar et al. | 709/203 |
| 6,216,129 B1 * | 4/2001 | Eldering | 705/36 R |
| 6,236,975 B1 * | 5/2001 | Boe et al. | 705/7.32 |
| 6,285,987 B1 * | 9/2001 | Roth et al. | 705/14.71 |
| 6,286,005 B1 | 9/2001 | Cannon | |
| 6,334,145 B1 | 12/2001 | Adams et al. | |
| 6,338,044 B1 | 1/2002 | Cook et al. | |
| 6,345,279 B1 | 2/2002 | Li et al. | |
| 6,353,849 B1 * | 3/2002 | Linsk | 709/203 |
| 6,381,465 B1 | 4/2002 | Chern et al. | |
| 6,393,407 B1 | 5/2002 | Middleton, III et al. | |
| 6,405,243 B1 | 6/2002 | Nielsen | |
| 6,408,309 B1 | 6/2002 | Agarwal | |
| 6,421,683 B1 * | 7/2002 | Lamburt | 1/1 |
| 6,442,529 B1 * | 8/2002 | Krishan et al. | 705/14.52 |
| 6,446,261 B1 | 9/2002 | Rosser | |
| 6,453,347 B1 * | 9/2002 | Revashetti et al. | 709/224 |
| 6,470,079 B1 * | 10/2002 | Benson | 379/114.13 |
| 6,477,575 B1 * | 11/2002 | Koeppel et al. | 709/224 |
| 6,513,052 B1 * | 1/2003 | Binder | 1/1 |
| 6,560,578 B2 | 5/2003 | Eldering | 705/14.39 |
| 6,591,248 B1 * | 7/2003 | Nakamura et al. | 705/14.52 |
| 6,647,257 B2 * | 11/2003 | Owensby | 455/414.1 |
| 6,684,249 B1 | 1/2004 | Frerichs et al. | |
| 6,690,394 B1 | 2/2004 | Harui | |
| 6,698,020 B1 | 2/2004 | Zigmond et al. | |
| 6,718,551 B1 | 4/2004 | Swix et al. | |
| 6,738,978 B1 * | 5/2004 | Hendricks et al. | 725/35 |
| 6,886,000 B1 | 4/2005 | Aggarwal et al. | |
| 6,907,566 B1 * | 6/2005 | McElfresh et al. | 715/210 |
| 6,915,271 B1 * | 7/2005 | Meyer et al. | 705/14.35 |
| 6,920,326 B2 | 7/2005 | Agarwal et al. | |
| 6,925,441 B1 * | 8/2005 | Jones et al. | 705/7.33 |
| 6,990,462 B1 | 1/2006 | Wilcox et al. | |
| 7,010,497 B1 * | 3/2006 | Nyhan et al. | 705/14.44 |
| 7,039,599 B2 * | 5/2006 | Merriman et al. | 705/14.52 |
| 7,072,947 B1 | 7/2006 | Knox et al. | |
| 7,149,537 B1 | 12/2006 | Kupsh et al. | |
| 7,168,084 B1 * | 1/2007 | Hendricks et al. | 725/42 |
| 7,203,684 B2 | 4/2007 | Carobus et al. | |
| 7,243,082 B1 * | 7/2007 | Forlai | 705/37 |
| 7,356,477 B1 * | 4/2008 | Allan et al. | 705/14.4 |
| 7,370,002 B2 | 5/2008 | Heckerman et al. | |
| 7,403,904 B2 * | 7/2008 | Abe et al. | 705/7.29 |
| 7,519,566 B2 * | 4/2009 | Prigogin et al. | 706/21 |
| 7,539,652 B2 | 5/2009 | Flinn et al. | |
| 7,558,559 B2 | 7/2009 | Alston | |
| 7,669,212 B2 * | 2/2010 | Alao et al. | 725/32 |
| 7,685,019 B2 | 3/2010 | Collins | |
| 7,730,017 B2 | 6/2010 | Nance et al. | |
| 7,734,632 B2 | 6/2010 | Wang | |
| 7,747,676 B1 * | 6/2010 | Nayfeh et al. | 709/203 |
| 7,822,636 B1 * | 10/2010 | Ferber et al. | 705/14.4 |
| 7,870,576 B2 | 1/2011 | Eldering | 725/34 |
| 7,882,518 B2 * | 2/2011 | Finseth et al. | 725/34 |
| 7,903,099 B2 * | 3/2011 | Baluja | 345/204 |
| 7,912,843 B2 * | 3/2011 | Murdock et al. | 707/749 |
| 7,987,182 B2 * | 7/2011 | Slothouber et al. | 707/722 |
| 8,019,645 B2 * | 9/2011 | Mattingly et al. | 705/14.41 |
| 8,046,797 B2 * | 10/2011 | Bentolila et al. | 725/46 |
| 8,060,406 B2 * | 11/2011 | Blegen | 705/14.58 |
| 8,108,895 B2 * | 1/2012 | Anderson et al. | 725/36 |
| 8,112,308 B1 * | 2/2012 | Ho et al. | 705/35 |
| 8,229,786 B2 * | 7/2012 | Cetin et al. | 705/14.1 |
| 8,380,562 B2 * | 2/2013 | Toebes et al. | 705/14.26 |
| 2001/0044739 A1 | 11/2001 | Bensemana | |
| 2001/0047272 A1 | 11/2001 | Frietas et al. | |
| 2001/0051925 A1 | 12/2001 | Kang | |
| 2002/0006803 A1 | 1/2002 | Mendiola et al. | |
| 2002/0016736 A1 | 2/2002 | Cannon et al. | |
| 2002/0019829 A1 | 2/2002 | Shapiro | |
| 2002/0052781 A1 | 5/2002 | Aufricht et al. | |
| 2002/0052925 A1 * | 5/2002 | Kim et al. | 709/217 |
| 2002/0072965 A1 * | 6/2002 | Merriman et al. | 705/14 |
| 2002/0075305 A1 | 6/2002 | Beaton et al. | |
| 2002/0077130 A1 | 6/2002 | Owensby | |
| 2002/0078147 A1 | 6/2002 | Bouthors et al. | |
| 2002/0082923 A1 * | 6/2002 | Merriman et al. | 705/14 |
| 2002/0083411 A1 | 6/2002 | Bouthors et al. | |
| 2002/0099842 A1 | 7/2002 | Jennings et al. | |
| 2002/0137507 A1 | 9/2002 | Winkler | |
| 2002/0138291 A1 | 9/2002 | Vaidyanathan et al. | |
| 2002/0161770 A1 | 10/2002 | Shapiro et al. | |
| 2002/0164977 A1 | 11/2002 | Link, II et al. | |
| 2002/0165773 A1 | 11/2002 | Natsuno et al. | |
| 2002/0175935 A1 | 11/2002 | Wang et al. | |
| 2003/0003935 A1 | 1/2003 | Vesikivi et al. | |
| 2003/0023489 A1 | 1/2003 | McGuire et al. | |
| 2003/0040297 A1 | 2/2003 | Pecen et al. | |
| 2003/0083931 A1 | 5/2003 | Lang | |
| 2003/0101454 A1 | 5/2003 | Ozer et al. | |
| 2003/0126015 A1 | 7/2003 | Chan et al. | |
| 2003/0126146 A1 | 7/2003 | Van Der Riet | |
| 2003/0130887 A1 * | 7/2003 | Nathaniel | 705/14 |
| 2003/0154300 A1 | 8/2003 | Mostafa | |
| 2003/0171990 A1 * | 9/2003 | Rao et al. | 705/14 |
| 2003/0182567 A1 | 9/2003 | Barton et al. | |
| 2003/0188017 A1 | 10/2003 | Nomura | |
| 2003/0191689 A1 | 10/2003 | Bosarge et al. | |
| 2003/0197719 A1 | 10/2003 | Lincke et al. | |
| 2004/0003398 A1 | 1/2004 | Donian et al. | |
| 2004/0043777 A1 | 3/2004 | Brouwer et al. | |
| 2004/0045029 A1 | 3/2004 | Matsuura | |
| 2004/0054576 A1 | 3/2004 | Kanerva et al. | |
| 2004/0068435 A1 | 4/2004 | Braunzell | |
| 2004/0133480 A1 | 7/2004 | Domes | |
| 2004/0136358 A1 | 7/2004 | Hind et al. | |
| 2004/0158858 A1 | 8/2004 | Paxton et al. | |
| 2004/0185883 A1 | 9/2004 | Rukman | |
| 2004/0192359 A1 | 9/2004 | McRaild et al. | |
| 2004/0203761 A1 | 10/2004 | Baba et al. | |
| 2004/0203851 A1 | 10/2004 | Vetro et al. | |
| 2004/0204133 A1 | 10/2004 | Andrew et al. | |
| 2004/0204983 A1 * | 10/2004 | Shen et al. | 705/10 |
| 2004/0209649 A1 | 10/2004 | Lord | |
| 2004/0259526 A1 | 12/2004 | Goris et al. | |
| 2005/0010472 A1 * | 1/2005 | Quatse et al. | 705/14 |
| 2005/0010641 A1 | 1/2005 | Staack | |
| 2005/0021397 A1 | 1/2005 | Cui et al. | |
| 2005/0027587 A1 * | 2/2005 | Latona et al. | 705/10 |
| 2005/0028188 A1 * | 2/2005 | Latona et al. | 725/13 |
| 2005/0060425 A1 | 3/2005 | Yeh et al. | |
| 2005/0091106 A1 * | 4/2005 | Reller et al. | 705/14 |
| 2005/0125397 A1 | 6/2005 | Gross et al. | |
| 2005/0138140 A1 | 6/2005 | Wen et al. | |
| 2005/0228680 A1 | 10/2005 | Malik | |
| 2005/0228797 A1 | 10/2005 | Koningstein et al. | |
| 2005/0239495 A1 | 10/2005 | Bayne | |
| 2005/0239504 A1 | 10/2005 | Ishii et al. | |
| 2005/0249216 A1 | 11/2005 | Jones | |
| 2005/0273384 A1 * | 12/2005 | Fraser | 705/14 |
| 2005/0273465 A1 | 12/2005 | Kimura | |
| 2005/0273833 A1 | 12/2005 | Soinio | |
| 2005/0289000 A1 * | 12/2005 | Chiang et al. | 705/14 |
| 2005/0289113 A1 | 12/2005 | Bookstaff | |
| 2006/0031327 A1 | 2/2006 | Kredo | |
| 2006/0040642 A1 | 2/2006 | Boris et al. | |
| 2006/0048059 A1 | 3/2006 | Etkin | |
| 2006/0059133 A1 | 3/2006 | Moritani | |
| 2006/0068845 A1 | 3/2006 | Muller et al. | |
| 2006/0069616 A1 * | 3/2006 | Bau | 705/14 |
| 2006/0075425 A1 | 4/2006 | Koch et al. | |
| 2006/0095511 A1 | 5/2006 | Munarriz et al. | |
| 2006/0117378 A1 | 6/2006 | Tam et al. | |
| 2006/0123014 A1 | 6/2006 | Ng | |
| 2006/0129455 A1 | 6/2006 | Shah | |
| 2006/0141923 A1 | 6/2006 | Goss | |

| | | |
|---|---|---|
| 2006/0161520 A1 | 7/2006 | Brewer et al. |
| 2006/0168616 A1 | 7/2006 | Candelore |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0259358 A1* | 11/2006 | Robinson et al. ............... 705/14 |
| 2006/0276170 A1 | 12/2006 | Radhakrishnan et al. |
| 2006/0276213 A1 | 12/2006 | Gottschalk et al. |
| 2006/0277103 A1* | 12/2006 | Fujita et al. ..................... 705/14 |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004333 A1 | 1/2007 | Kavanti |
| 2007/0011344 A1 | 1/2007 | Paka et al. |
| 2007/0016743 A1* | 1/2007 | Jevans ........................... 711/164 |
| 2007/0022021 A1 | 1/2007 | Walker et al. |
| 2007/0027703 A1 | 2/2007 | Hu et al. |
| 2007/0027760 A1 | 2/2007 | Collins et al. |
| 2007/0027762 A1 | 2/2007 | Collins et al. |
| 2007/0037562 A1 | 2/2007 | Smith-Kerker et al. |
| 2007/0047523 A1 | 3/2007 | Jiang |
| 2007/0061195 A1 | 3/2007 | Liu et al. |
| 2007/0061300 A1 | 3/2007 | Ramer et al. |
| 2007/0072631 A1 | 3/2007 | Mock et al. |
| 2007/0074262 A1 | 3/2007 | Kikkoji et al. |
| 2007/0083602 A1 | 4/2007 | Heggenhougen et al. |
| 2007/0088609 A1* | 4/2007 | Reller et al. ..................... 705/14 |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0094066 A1 | 4/2007 | Kumar et al. |
| 2007/0100651 A1 | 5/2007 | Ramer et al. |
| 2007/0100805 A1 | 5/2007 | Ramer et al. |
| 2007/0105536 A1 | 5/2007 | Tingo, Jr. |
| 2007/0113243 A1 | 5/2007 | Brey |
| 2007/0117571 A1 | 5/2007 | Musial |
| 2007/0118592 A1 | 5/2007 | Bachenberg |
| 2007/0136457 A1 | 6/2007 | Dai et al. |
| 2007/0149208 A1 | 6/2007 | Syrbe et al. |
| 2007/0180147 A1 | 8/2007 | Leigh |
| 2007/0192409 A1 | 8/2007 | Kleinstern et al. |
| 2007/0198485 A1 | 8/2007 | Ramer et al. |
| 2007/0214470 A1 | 9/2007 | Glasgow et al. |
| 2007/0233671 A1* | 10/2007 | Oztekin et al. ..................... 707/5 |
| 2007/0260624 A1 | 11/2007 | Chung et al. |
| 2007/0276537 A1* | 11/2007 | Walker et al. .................. 700/238 |
| 2007/0288950 A1 | 12/2007 | Downey et al. |
| 2007/0290787 A1 | 12/2007 | Fiatal et al. |
| 2008/0004046 A1 | 1/2008 | Mumick et al. |
| 2008/0013537 A1 | 1/2008 | Dewey et al. |
| 2008/0032703 A1 | 2/2008 | Krumm et al. |
| 2008/0032717 A1 | 2/2008 | Sawada et al. |
| 2008/0065476 A1* | 3/2008 | Klein et al. ..................... 705/14 |
| 2008/0065491 A1 | 3/2008 | Bakman |
| 2008/0070579 A1 | 3/2008 | Kankar et al. |
| 2008/0071875 A1 | 3/2008 | Koff et al. |
| 2008/0071929 A1 | 3/2008 | Motte et al. |
| 2008/0082686 A1 | 4/2008 | Schmidt et al. |
| 2008/0091796 A1 | 4/2008 | Story |
| 2008/0133344 A1* | 6/2008 | Hyder et al. ..................... 705/14 |
| 2008/0140476 A1* | 6/2008 | Anand et al. ........................ 705/7 |
| 2008/0140508 A1* | 6/2008 | Anand et al. ...................... 705/10 |
| 2008/0140524 A1* | 6/2008 | Anand et al. ..................... 705/14 |
| 2008/0147495 A1* | 6/2008 | Bal et al. ......................... 705/14 |
| 2008/0228568 A1 | 9/2008 | Williams et al. |
| 2008/0243619 A1 | 10/2008 | Sharman et al. |
| 2008/0249832 A1 | 10/2008 | Richardson et al. |
| 2008/0262927 A1* | 10/2008 | Kanayama et al. .............. 705/14 |
| 2008/0271068 A1 | 10/2008 | Ou et al. |
| 2008/0281606 A1 | 11/2008 | Kitts et al. |
| 2008/0288476 A1 | 11/2008 | Kim et al. |
| 2008/0319836 A1 | 12/2008 | Aaltonen et al. |
| 2009/0006194 A1 | 1/2009 | Sridharan et al. |
| 2009/0029721 A1 | 1/2009 | Doraswamy |
| 2009/0049090 A1 | 2/2009 | Shenfield et al. |
| 2009/0063249 A1 | 3/2009 | Tomlin et al. |
| 2009/0106111 A1 | 4/2009 | Walk et al. |
| 2009/0125377 A1 | 5/2009 | Somji et al. |
| 2009/0132395 A1 | 5/2009 | Lam et al. |
| 2009/0138304 A1 | 5/2009 | Aharoni et al. |
| 2009/0197619 A1 | 8/2009 | Colligan et al. |
| 2009/0216847 A1 | 8/2009 | Krishnaswamy et al. |
| 2009/0240677 A1 | 9/2009 | Parekh et al. |
| 2009/0275315 A1 | 11/2009 | Alston |
| 2009/0286520 A1 | 11/2009 | Nielsen et al. |
| 2009/0298483 A1 | 12/2009 | Bratu et al. |
| 2010/0030647 A1* | 2/2010 | Shahshahani ............... 705/14.66 |
| 2010/0057548 A1* | 3/2010 | Edwards ..................... 705/14.13 |
| 2010/0082397 A1 | 4/2010 | Blegen |
| 2010/0082423 A1 | 4/2010 | Nag et al. |
| 2010/0088152 A1 | 4/2010 | Bennett |
| 2010/0114654 A1 | 5/2010 | Lukose et al. |
| 2010/0125505 A1 | 5/2010 | Puttaswamy |
| 2010/0138271 A1 | 6/2010 | Henkin |
| 2010/0161424 A1 | 6/2010 | Sylvain |
| 2010/0169157 A1 | 7/2010 | Muhonen et al. |
| 2010/0169176 A1 | 7/2010 | Turakhia |
| 2010/0257053 A1* | 10/2010 | Ferber et al. ................ 705/14.45 |
| 2010/0262487 A1* | 10/2010 | Edwards et al. ............ 705/14.43 |
| 2011/0106840 A1 | 5/2011 | Barrett et al. |
| 2011/0209067 A1 | 8/2011 | Bogess et al. |
| 2011/0276401 A1 | 11/2011 | Knowles et al. |

FOREIGN PATENT DOCUMENTS

| | | |
|---|---|---|
| DE | 10061984 | 6/2002 |
| EP | 0749081 A1 * | 5/1996 |
| EP | 1061465 | 12/2000 |
| EP | 1073293 | 1/2001 |
| EP | 1107137 | 6/2001 |
| EP | 1109371 | 6/2001 |
| EP | 1220132 | 7/2002 |
| EP | 1239392 | 9/2002 |
| EP | 1280087 | 1/2003 |
| EP | 1365604 | 11/2003 |
| EP | 1408705 | 4/2004 |
| EP | 1455511 | 9/2004 |
| EP | 1509024 | 2/2005 |
| EP | 1528827 | 5/2005 |
| EP | 1542482 | 6/2005 |
| EP | 1587332 | 10/2005 |
| EP | 1615455 | 1/2006 |
| EP | 1633100 | 3/2006 |
| EP | 1677475 | 7/2006 |
| EP | 1772822 | 4/2007 |
| GB | 2343051 | 4/2000 |
| GB | 2369218 | 5/2002 |
| GB | 2372867 | 9/2002 |
| GB | 2406996 | 4/2005 |
| GB | 2414621 | 11/2005 |
| GB | 2424546 | 9/2006 |
| JP | 2002-140272 | 5/2002 |
| JP | 2007087138 | 4/2007 |
| JP | 2007199821 | 8/2007 |
| KR | 20060011760 | 7/2004 |
| WO | 96/24213 | 8/1996 |
| WO | WO 97/07656 * | 3/1997 |
| WO | 98/21713 | 5/1998 |
| WO | WO 98/58334 * | 12/1998 |
| WO | 00/00916 | 1/2000 |
| WO | 00/30002 | 5/2000 |
| WO | 00/44151 | 7/2000 |
| WO | 01/22748 | 3/2001 |
| WO | 01/31497 | 5/2001 |
| WO | 01/44977 | 6/2001 |
| WO | 01/52161 | 7/2001 |
| WO | 01/57705 | 8/2001 |
| WO | 01/58178 | 8/2001 |
| WO | 01/63423 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 01/91400 | 11/2001 |
| WO | 01/93551 | 12/2001 |
| WO | 01/97539 | 12/2001 |
| WO | 02/09431 | 1/2002 |

| | | |
|---|---|---|
| WO | 02/31624 | 4/2002 |
| WO | 02/44989 | 6/2002 |
| WO | 02/054803 | 7/2002 |
| WO | 02/069585 | 9/2002 |
| WO | 02/069651 | 9/2002 |
| WO | 02/075574 | 9/2002 |
| WO | 02/084895 | 10/2002 |
| WO | 02/086664 | 10/2002 |
| WO | 02/096056 | 11/2002 |
| WO | 03/015430 | 2/2003 |
| WO | 03/019845 | 3/2003 |
| WO | 03/024136 | 3/2003 |
| WO | 03/049461 | 6/2003 |
| WO | 03/088690 | 10/2003 |
| WO | 2004/084532 | 9/2004 |
| WO | 2004/086791 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | WO 2005/013092 A2 * | 2/2005 |
| WO | 2005/020578 | 3/2005 |
| WO | 2005/029769 | 3/2005 |
| WO | 2005/073863 | 8/2005 |
| WO | 2005/076650 | 8/2005 |
| WO | 2006/002869 | 1/2006 |
| WO | 2006/005001 | 1/2006 |
| WO | 2006/016189 | 2/2006 |
| WO | 2006/024003 | 3/2006 |
| WO | 2006/027407 | 3/2006 |
| WO | 2006/040749 | 4/2006 |
| WO | 2006/093284 | 9/2006 |
| WO | 2006/119481 | 9/2006 |
| WO | 2007/001118 | 1/2007 |
| WO | 2007/002025 | 1/2007 |
| WO | 2007/060451 | 5/2007 |
| WO | 2007/091089 | 8/2007 |
| WO | 2007/103263 | 9/2007 |
| WO | 2008/013437 | 1/2008 |
| WO | 2008/024852 | 2/2008 |
| WO | 2008/045867 | 4/2008 |
| WO | 2008/147919 | 12/2008 |
| WO | 2009/009507 | 1/2009 |
| WO | 2009/032856 | 3/2009 |
| WO | 2009/061914 | 5/2009 |
| WO | 2009/077888 | 6/2009 |
| WO | 2009/099876 | 8/2009 |
| WO | 2009/158097 | 12/2009 |

OTHER PUBLICATIONS

Karuga, Gilber G. et al., AdPalette: an algorithm for customizing online advertisements on the fly Decision Support Systems, vol. 32, 2001.*

Ghose, Anindya et al., An Empirical Analysis of Search Enginer Advertising: Sponsored Search in Electronic Markets Managemetn Science, Informs, 2009.*

"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010).

"Combined Search and Examination Report", for United Kingdom Patent Application No. GB 0816228.1 dated Jan. 2009, Jan. 6, 2009,.

"Combined Search and Examination Report dated Mar. 7, 2008", for United Kingdom Patent Application No. GB 0721863.9, Mar. 7, 2008.

"Communication (Combined Search and Examination Report under Sections 17 and 18(3)) dated Jan. 30, 2009 issued from the United Kingdom Patent Office", in related United Kingdom Application No. GB 0818145.5 (8 pages).

"Communication (European Search Report) dated Jun. 26, 2008", in European Patent Application No. EP 08101394.

"Communication (European Search Report) dated Oct. 17, 2008 issued by the European Patent Office", in counterpart European Patent Application EP 08156763.

"Communication (International Search Report along with Written Opinion of International Searching Authority) mailed Oct. 8, 2008 issued by the International Searching Authority", in counterpart International Application PCT/EP 2008/056342.

"Communication (Notification Concerning Transmittal of International Preliminary Report on Patentability, International Preliminary Report on Patentability, and Written Opinion of the International Searching Authority)", issued in connection with related International Application PCT/EP 2008/051489 and mailed on Sep. 24, 2009 (6 pages).

"Communication (Search Report under Section 17 along with Examination Report under Section 18(3)) dated Oct. 6, 2008 issued by the United Kingdom Intellectual Property Office", in counterpart U.K. Application GB 0809321.3.

"Communication Pursuant to Article 94(3) EPC (European Examination Report) dated Oct. 23, 2008", issued in counterpart European Patent Application No. EP 08101394.8-1238.

"Examination Report", for counterpart European Patent Applicaiton No. 08153257.4 issued Jun. 2, 2009.

"Examination Report dated Nov. 9, 2009", for European Patent Application No. EP 08159355.0.

"Examination Report dated Jun. 17, 2009", issued in counterpart U.K. Application No. GB 0803273.2 by U.K. Intellectual Property Office (4 pages).

"International Preliminary Report on Patentability and Written Opinion issued Nov. 24, 2009", in International Application PCT/EP 2008/056342 (1 page).

"International Search Report", for International Application No. PCT/FI 2006/050455, dated Jul. 25, 2007.

"International Search Report and Written Opinion mailed on Aug. 26, 2011", for PCT/US 2011/034927 titled "Content Delivery Based on User Terminal Events," to Apple Inc.

"International Search Report and Written Opinion of the International Search Authority mailed Jun. 19, 2009", for International Application No. PCT/EP 2008/056069.

"International Search Report and Written Opinion of the International Searching Authority mailed Feb. 11, 2009, issued by the International Searching Authority", in related International Application PCT/EP 2008/063839 (11 pages).

"International Search Report mailed Mar. 24, 2009", in related PCT International Application No. PCT/EP 2008/063326 (4 pages).

"Notice of Allowance dated Apr. 29, 2011", U.S. Appl. No. 11/888,680, Apr. 29, 2011, 13 pages.

"Office Action dated Mar. 31, 2011 issue by the U.S. Patent Office", in related U.S. Appl. No. 12/080,124 (29 pages).

"Office Action issued from the USPTO dated Aug. 20, 2009", issued in related U.S. Appl. No. 12/075,593 (14 pages).

"Office Action issued Mar. 17, 2010", in related U.S. Appl. No. 12/075,593 (11 pages).

"Office Action Issued Oct. 15, 2010 by the U.S. Patent Office", in related U.S. Appl. No. 12/080,124 (28 pages).

"Search Report under Section 17 dated Jul. 7, 2008", in related U.K. Application GB 0803273.2.

"U.K. Search Report under Section 17 dated Oct. 23, 2007", in U.K. Application No. 0712280.7.

"Written Opinion of the International Searching Authority mailed Mar. 24, 2009 issued from the International Searching Authority", in related PCT International Application No. PCT/EP 2008/063326 (5 pages).

"XP002456252—Statement in Accordance with the Notice from the European Patent Office dated Oct. 1, 2007", concerning business methods (OJ Nov. 2007; p. 592-593), 592-593.

Hillard, Dustin et al., "Improving Ad Relevance in Sponsored Search", Proceedings of the third ACM international conference on Web search and data mining, WSDNR10, Feb. 4-6, 2010, Session: Ads, pp. 361-369, ACM, New York, New York, USA, 2010, 361-369.

Internet Reference, "Specific Media Behavioral Targeting Index", Specific Media, Inc., Irvine, CA, 2010, Available online at http://www.specificmedia.com/behavioral-targeting.php.

Langheinrich, Marc et al., "Unintrusive Customization Techniques for Web Advertising", Computer Networks: the International Journal of Computer and Telecommunications Networking, vol. 31, No. 11, May 1999, pp. 1259-1272, Elsevier North-Holland, Inc., New York, NY, 1999, 1259-1272.

Mueller, Milton, "Telecommunication Access in Age of Electronic Commerce: Toward a Third-Generation Service Policy", Nov. 1996, HeinOnline, 49. Fed. Comm L.J., 655-665.

Perkins, Ed, "When to buy airfare", http://www.smartertrael.com/travel-advice/when-to-buy-airfare.html?id=1628038, Nov. 21, 2006 (4 pages).

Regelson, Moira et al., "Predicting Click-Through Rate Using Keyword Clusters", Proceedings of the Second Workshop on Sponsored Search Auctions, EC'06, SSA2, Jun. 11, 2006, ACM, 2006.

Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529, ACM, 2007., 521-529.

Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010).

\* cited by examiner

NETWORK-BASED TARGETED CONTENT DELIVERY BASED ON QUEUE ADJUSTMENT FACTORS CALCULATED USING THE WEIGHTED COMBINATION OF OVERALL RANK, CONTEXT, AND COVARIANCE SCORES FOR AN INVITATIONAL CONTENT ITEM

FIELD

The following relates to electronic content delivery and more specifically relates to systems and methods for audience targeting based on a performance history of invitational content, such as advertisements.

BACKGROUND

Computer applications, websites, or other electronic content including offers for products and services generally require a user to explicitly select and/or interact with one or more portions of the content being presented to generate a conversion (e.g., completion a sale or purchase, submission of information to a content provider, causing delivery of additional information to the user or any other pre-defined response for the content). For example, an advertisement for a product or service can require the user to select the advertisement content and navigate to the online store offering the product for sale. At the online store, the user can then enter information to purchase or obtain additional information regarding the product or service.

In many types of electronic content maintained by (primary) content providers, invitational content (i.e., the portions of the content offering products and services) is generally provided other (secondary) content providers. That is, primary content providers typically offer portions for inserting such invitational content, directly or via an agent, for use by one or more other secondary content providers. Accordingly, the invitational content in these portions varies over time, depending on the various arrangements between the primary content provider and the various secondary content providers. For example, each of the secondary content providers may arrange for a number of impressions of their invitational content. Further, secondary content providers may also arrange to have their invitational content associated only with a particular context.

SUMMARY

The present technology provides systems and methods for audience targeting based on a performance history of invitational content from secondary content providers, such as advertisements. In operation, responsive to request from a user for content package associated with a context, a queue of invitational content is retrieved. Such a queue can be, for example, the queue established according to the predefined arrangement between a primary content provider and a group of secondary content providers. This queue is then adjusted to generate an adjusted queue for requesting user. The invitational content for content package can then be selected based on this adjusted queue. In some embodiments, a premium pricing or bidding process can be used to select the invitational content.

The adjusted queue can be generated by applying queue adjustment factors to adjust the positions of the invitational content in the queue. In particular, at least one of overall rank scores, content rank scores, and covariance scores can be computed and combined to generate the queue adjustment factors. These factors can then be used to adjust a position of invitational content in the retrieved queue. In some cases, the queue adjustment factors consist of weighted or un-weighted sums of these scores.

In the present technology, the overall rank scores specify an overall performance of the invitational content in the queue with respect to other invitational content previously presented to users. Effectively, the overall rank scores specify an overall performance of users' responsiveness in regards to the invitational content in the queue, based on a correlation between the behavior of all users and the requesting user with respect to previously presented invitational content. The content rank scores specify a performance of the invitational content in the queue, in the context of the request, with respect to other invitational content previously presented to users. The covariance scores specify an interest in the invitational content in the queue, based on a correlation between the behavior of all users and the requesting user with respect to previously presented invitational content.

DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
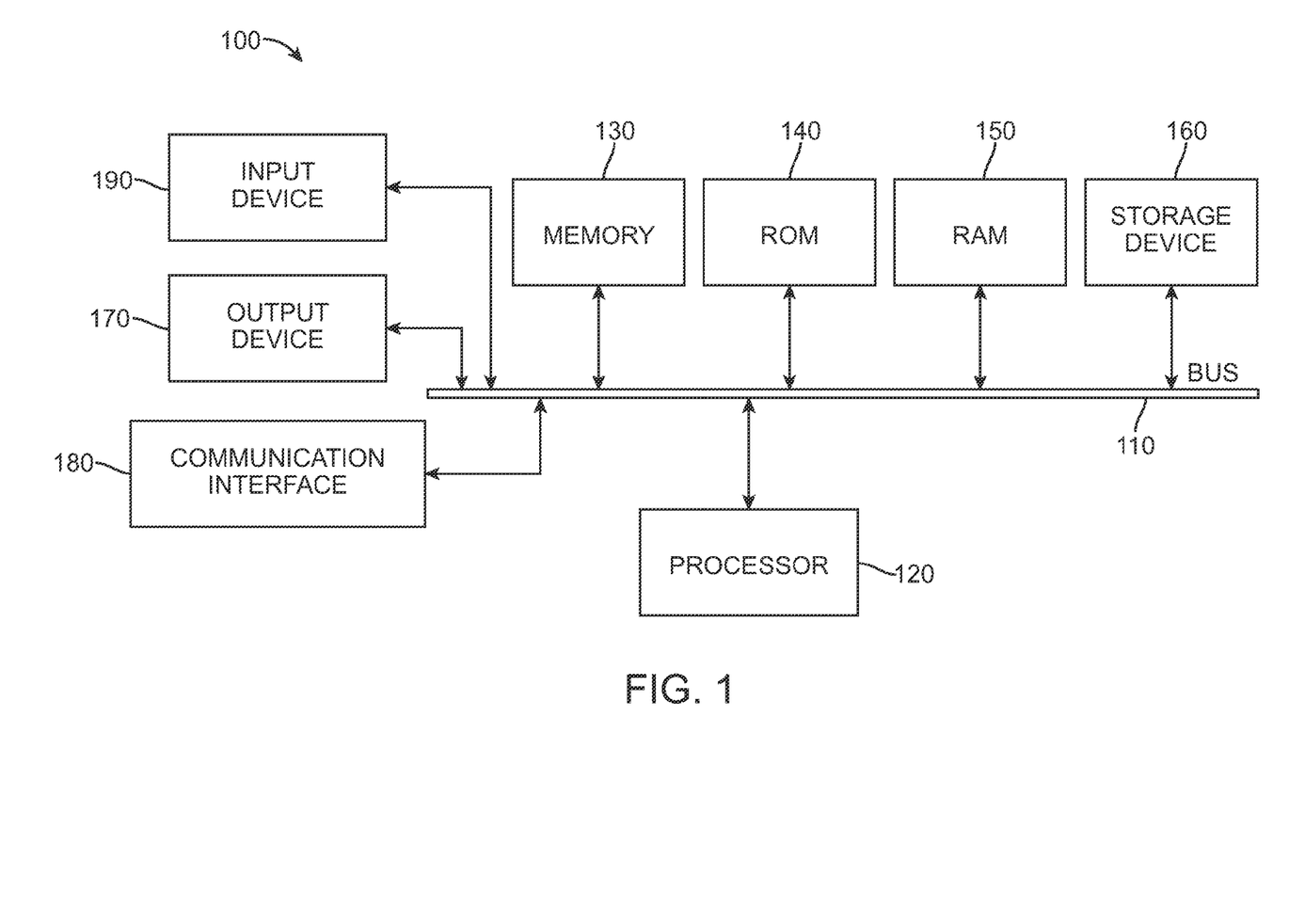
FIG. 1 illustrates an example computing device.

With reference to FIG. 1, a general-purpose computing device 100 which can be portable or stationary is shown, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed.

For clarity of explanation, the illustrative system embodiment is presented as including individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI), field-programmable gate array (FPGA), and application specific integrated circuit (ASIC) hardware embodiments may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
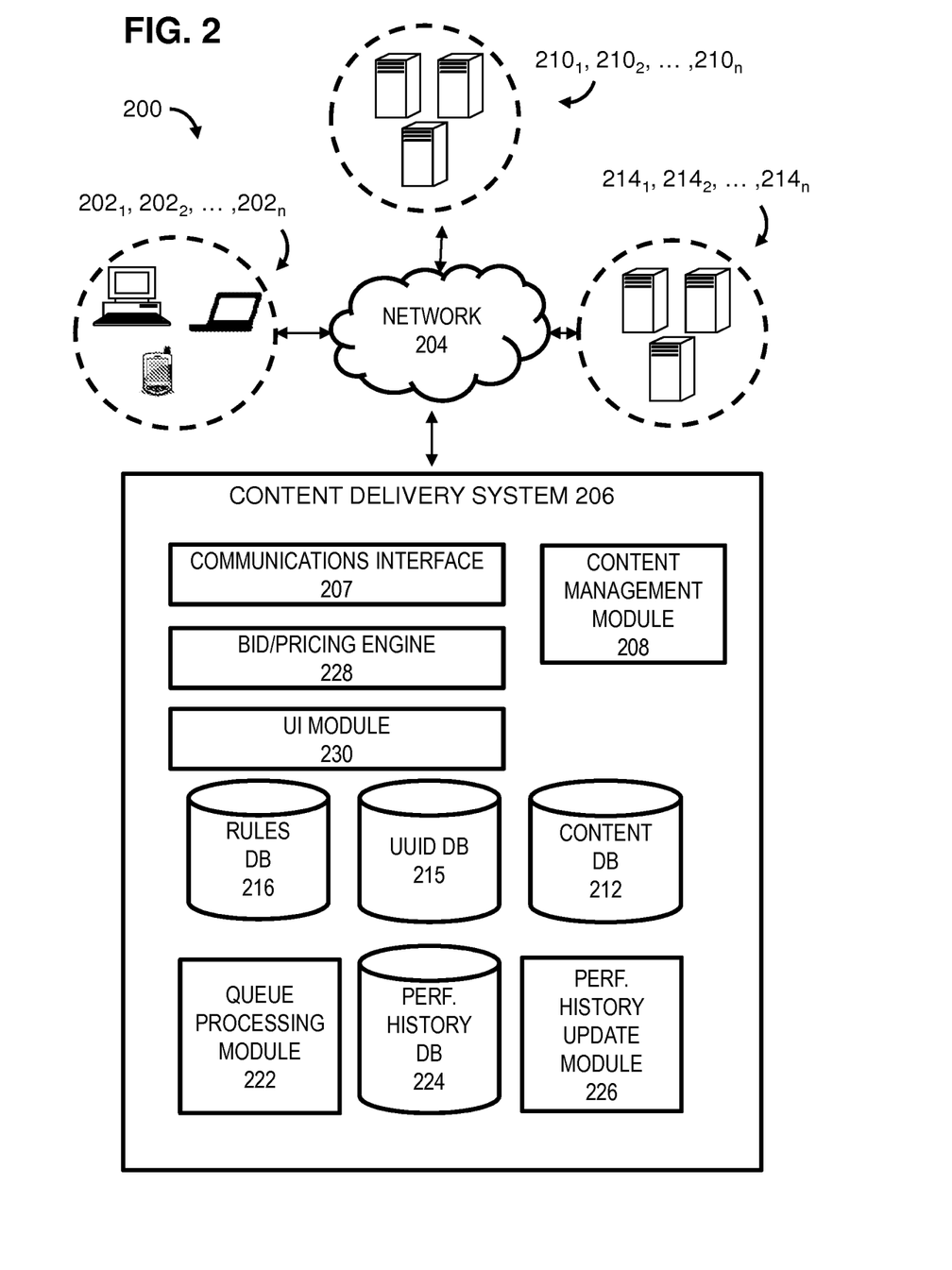
FIG. 2 illustrates an exemplary system embodiment.

The present system and method is particularly useful for assembling and delivering content packages to the user terminals, where an invitational content from secondary content providers, such as advertisements, announcements, and other types of propaganda and inducements, is selected for the content package is based on past user interactions with invitational content. A system 200 is illustrated in FIG. 2 wherein electronic devices communicate via a network for purposes of exchanging content and other data. In some embodiments, the present system and method are carried out on a local area network such as that illustrated in FIG. 2. However, the present principles are applicable to a wide variety of network configurations that facilitate the intercommunication of electronic devices. For example, each of the components of system 200 in FIG. 2 can be implemented in a localized or distributed fashion in a network.

In system 200, a content package is delivered to user terminals $202_1 \ldots 202_n$ (collectively "202") connected to a network 204 by direct and/or indirect communications with a content delivery system 206. In particular, the content delivery system 206 receives a request for an electronic content, such as a web page, from one of user terminals 202. Thereafter, the content delivery system 206 assembles a content package in response to the request and transmits the assembled content package to the requesting one of user terminals 202. The content in the assembled content package can include text, graphics, audio, video, or any combination thereof. Further, the assembled content packages can includes invitational content designed to inform or elicit a pre-defined response from the user and that can vary over time, such as advertisements. The content delivery system can include a communications interface 207 to facilitate communications with the user terminals 202 and any other components in system 200.

The content delivery system 206 includes a content management module 208 that facilitates generation of the assembled content package that includes invitational content. Specifically, the content management module can combine content from one or more one or more primary content providers $210_1 \ldots 210_n$ (collectively "210") and content from one or more secondary content providers $214_1 \ldots 214_n$ (collectively "214") to generate the assembled content package for the user terminals 202.

Although, primary and secondary providers 210, 214 are presented herein as discrete, separate entities, this is for illustrative purposes only. In some cases, the primary and secondary providers 210, 214 can be the same entity. Thus, a single entity may define and provide both static and time-varying content.

For example, in the case of a web page being delivered to a requesting one of user terminals 202, the content management module 208 can assemble a content package by requesting the data for the web page from one of the primary content providers 210 maintaining the web page. For the time-varying invitational content on the web page provided by the secondary content providers 214, the content management module 208 can request the appropriate data generally according to the arrangement between the primary and secondary content providers 210 and 214. For example, the invitational content from the secondary providers 214 can be selected based on a guaranteed number of impressions. Alternatively, the invitational content from the secondary providers 214 can also be selected based on the context of the web page. However, any other arrangements and configuration for selecting invitational content from the secondary providers 210 can also be used.

Although the content management module 208 can be configured to request that data be sent directly from content providers 210 and 214, a cached arrangement can also be used to improve performance of the content delivery system 206 and improve overall user experience. That is, the content delivery system 206 can include a content database 212 for locally storing/caching content maintained by content providers 210 and 214. The data in the content database 212 can be refreshed or updated on a regular basis to ensure that the content in the database 212 is up to date at the time of a request from a user terminal. However, in some cases, the content management module 208 can be configured to retrieve data directly from content providers 210 and 214 if the metadata associated with the data in content database 212 appears to be outdated or corrupted.

In the various embodiments, the one or more databases described herein can be implemented any type of data structures. Such data structures include, but are not limited to data structures for relational databases, key/value stores, graph databases, hierarchical databases, and distributed or columnar stores. Accordingly, although the various embodiments described herein may refer to specific data structures in some embodiments, in other embodiments such data structures can be substituted for any other type of database structure.

In the various embodiments, the content delivery 206 can also include a unique user identifier (UUID) database 215 that can be used for managing sessions with the various user terminal devices 202. The UUID database 215 can be used with a variety of session management techniques. For example, the content delivery system 206 can implement an HTTP cookie or other conventional session management methods (e.g., IP address tracking, URL query strings, hidden form fields, window name tracking, authentication methods, and local shared objects) for user terminals 202 connected to content delivery system 206 via a substantially persistent network session. However, other methods can be used as well. For example, in the case of mobile devices or other types of user terminals connecting using multiple or non-persistent network sessions, multiple requests for content from such devices may be assigned to a same entry in the UUID database 215. Such an assignment can be provided by analyzing requesting device attributes in order to determine whether such requests can be attribute to a same device. Such attributes can include device or group-specific attributes.

As described above, content maintained by the content providers 210 and 214 can be combined and/or presented according a predefined arrangement between the two content providers, which can be embodied as a set of rules. In an arrangement where the content delivery system assembles the content package from multiple content providers, these rules can be stored in a rules database 216 in content delivery system 206 and content management module 208 can be configured to assemble the content package for user terminals 202 based on these rules. The rules can specify how to select content from secondary content providers 214 and the primary content providers 210 in response to a request from one of user terminals 202. For example, in the case of a web page maintained by one of primary providers 210 and including variable advertisement portions, the rules database 216 can specify rules for selecting one of the secondary providers 214. The rules can also specify how to select specific content from the selected one of secondary providers 214 to be combined with the content provided by one of primary providers 210. Once assembled, the assembled content package can be sent to a requesting one of user terminals. However, the content package is not limited to the content from content providers 210 and 214. Rather, the content package can include other data generated at the content delivery system 206.

As described above, arrangements between the content providers 210 and 214 can result in content from one of primary content providers 210 being combined with invitational content from multiple ones of secondary content providers 214, based on the rules database 216. Although the rules database 216 can be accessed each time a request is received from one of user terminals 202, such a configuration can limit performance. Therefore, in many cases, the rules in rules database 216 are used to define at least one queue of invitational content from the secondary providers 214. Thus, when a content package is being assembled by the content management module 208, the content management module 208 first constructs and/or retrieves the queue. Thereafter, the content management module 208 can select an invitational content from one of the secondary content providers according to the queue and form the assembled content package. For example, in one configuration, an invitational content at the top of the queue can be selected. In another configuration, an invitational content associated with a set of contextual characteristics and that is highest positioned in the queue can be selected.

As used herein, the term "contextual characteristics" refers to the characteristics of a particular audience in the network 204 associated with one or more of user terminals 202. Contextual characteristics can include channel characteristics, demographic characteristics, behavioral characteristics, and spatial-temporal characteristics. Channel characteristics can define the specific delivery channel being used to deliver a content package. For example, channel characteristics can include a type of electronic content, a type of device or user terminal, a carrier or network provider, or any other characteristic that defines a specific delivery channel for the content package. Spatial-temporal characteristics can define a location, a date, a time, or any other characteristic that defines a geographic location and/or a time for delivery of the content package. Demographic characteristics can define personal and/or socio-economic characteristics of the user requesting the content package. Behavioral characteristics can define user behaviors for one or more different types of content, separately or in combination with any other contextual characteristics. That is, different behavioral characteristics may be associated with different channel, demographic, or spatial temporal characteristics. For example, users may be associated with higher conversion or response rates for some types of delivery channels.

One concern with the arrangements typically entered into by secondary content providers 214 is that they can result in invitational content of little or no interest being presented to users at many times. As a result, even though a desired number of impressions can be achieved, the rate of response to such invitational content may be low and/or the resulting targeted audience may be incorrect or suboptimal. As a result, content providers 210 and 214 can be negatively impacted. For example, if the primary content providers 210 receive compensation based a number or rate of conversions of advertisements provided by secondary content providers 214, the resulting low conversion rate will result in lower revenues for the primary content providers 210. At the same time, the lower number or rate of conversions of advertisements can result in lower exposure or sales for the secondary content provider 214. In the case of an arrangement based on the number of impressions, the primary content provider 210 would be compensated, but the lower number or rate of conversions of advertisements can result in lower exposure or sales for the secondary content provider 214, as described above. As a result, such secondary content providers 214 may opt to pursue relationships with other primary content providers 210, resulting in potential loss of revenues for primary content providers 210.

The various embodiments therefore provide systems and methods for improving audience targeting by managing the presentation of invitational content from such secondary content providers 214. In particular, systems and methods are provided for adjusting a queue of invitational content at content delivery system 206 in order to provide invitational content at a user terminal that is of greater interest to an associated user. As a result, improved targeting of users is provided, which generally correlates to an increase in desired responses or conversions. In the various embodiments, the positions of invitational content in the queue are adjusted based on the performance history of previously invitational content. As a result, an adjusted queue is generated in which invitational content that is likely of greater interest to the requesting user or is more likely to elicit a response from the requesting user is pushed towards the top.

In operation, system 200 can provide a queue processing module 222 for providing such an adjustment of the queue. In operation, a queue processing module 222 receives the queue, a context associated with the request, and identifying information for the user associated with the request. For example, such information can be received from the content management module 208 or other components in system 200. Thereafter, the queue processing module can access a performance history database 224 to retrieve a performance history of previously presented invitational content and adjust the queue accordingly. The updated queue can then be provided, for example, to the content management module 208, which can thereafter assemble and deliver a content package to the requesting user terminal. Such a method is described in greater detail below with respect to FIG. 3.

In the various embodiments, the performance history database 224 can be updated using a performance history update module 226. In some cases, the performance history update module 226 can be configured to add additional history data to the history database 224. However, in other cases, an extended history of user interactions with invitational content may not accurately reflect a current interest of users. Accordingly, update module 226 can also be configured to maintain the history database 224 to include only more recently acquired data. For example, the update module 226 can be configured to maintain in the history database 224 to include only data from the last two to three months. However, the update module 226 can be configured to adjust the data in history database 224 to cover any span of time.

Figure 3:
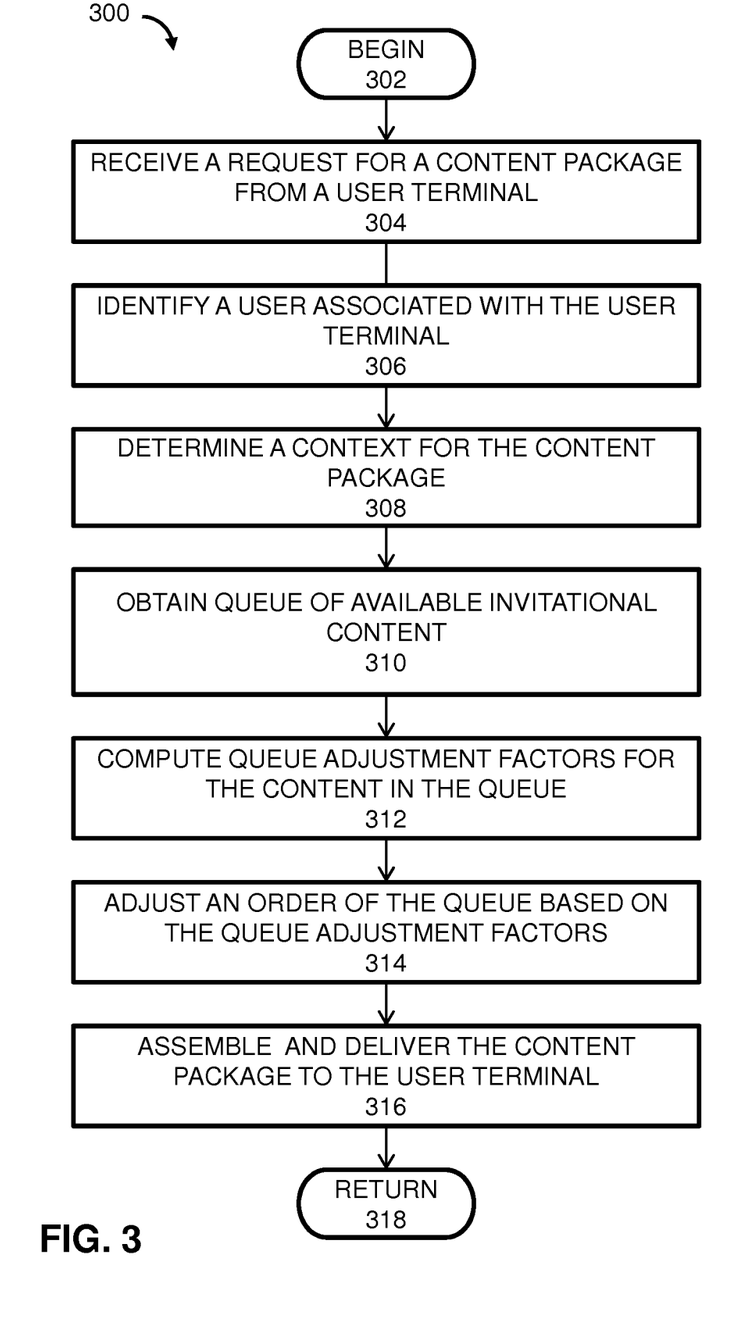
FIG. 3 is a flowchart illustrating a method embodiment for managing delivery of content packages to a user terminal.

FIG. 3 is a flowchart illustrating steps in an exemplary method 300 for assembling and delivering content packages. Although specific steps are shown in FIG. 3, in other embodiments a method can have more or less steps than shown. The method 300 begins at step 302 and continues on to step 304. At step 304, a request for a content package is received from a one of user terminals 202 at the content delivery system 206. As described above, such a request can identify a content from one of primary content providers 210 that is to be delivered to the requesting user terminal. The request can also include additional information regarding the requesting user terminal. For example, the request can include information that identifies the requesting user terminal, its location in network 204, and/or a user associated with the requesting terminal. That is, the request can include specify one or more contextual characteristics for the context, explicitly or implicitly, as described above.

After the request is received at step 304, a user associated with the user terminal is identified at step 306. This identification can be performed in a variety of ways. For example, as described above, the request can include some identifying information, associated with the requesting user terminal or the associated user, which can then be correlated to an entry in the UUID database 215 to retrieve an identity of the user. In other configurations, the user can be identified based analyzing requesting device attributes in order to determine whether such requests can be attribute to a same device, also as described above. Other methods can also be used.

Together or separately with step 306, a context for the content package can be determined by the content management module 208. Thereafter, based on the context identified at step 308, a queue of available invitational content from secondary providers 214 can be obtained at step 310. For example, as described above, a queue can be constructed from the rules database 216 by the content management module 208. However, in some embodiments, the queue can be generated a priori for specific contexts. For example, for specific devices, electronic content from a particular network location, or other known or common contexts, the queue can be generated beforehand and stored. Thereafter, the content management module 208 can access the queue as needed.

Once the queue is obtained at step 310, a user-specific queue can be generated and used for assembling a content package for the user starting at step 312. At step 312, queue adjustment factors can be calculated for the invitational content in the queue. The queue adjustment factors can specify a value for adjusting a position of an invitational content in the queue. In some cases, the queue adjustment factor can specify an absolute amount of change in position in the queue. For example, the queue adjustment factor can specify a minimum number of positions that a secondary content should be moved up or down in the queue. In other cases, the queue adjustment factor can specify a relative position or portion of the queue to which an invitational content should be moved. For example, the queue adjustment factor can specify that a particular invitational content should be moved to the top or bottom of the queue. In yet another example, the queue adjustment factor can be used to categorize the invitational content in the queue into one a plurality of queue groups, each with different priority or positions in the adjusted queue. Thereafter, the invitational content in these groups can be ordered according to the relative order they had in the original queue or using a different order based on other factors.

In the various embodiments, the queue adjustment factor for invitational content is calculated based on at least one of an overall rank score, a context rank score, and covariance score for the invitational content. The overall rank score is a score related to the likelihood of the invitational content resulting in a conversion as compared to other invitational content, irrespective of other factors. Thus, the overall rank score is provided by constructing a model or table of values that correlates performance of previously presented invitational content to specific scores in a range. For example, the previously presented invitational content in the performance history database 224 can be arranged in a table according to the increasing number or rate of responses or conversions in the performance history. Thereafter, increasingly larger scores can be associated with the ordered entries in the table. An overall rank score for an invitational content of interest can then be obtained by a lookup operation to retrieve an associated score. In another example, a model or lookup table can be generated that associates different score values to different numbers or rates of responses or conversions. Thus, the overall rank score can be obtained by retrieving a performance history of an invitational content of interest to obtain some measure of the relative number or rate of conversions or responses for the invitational content as compared to other invitational content in the performance history. Such a measure can be a total number of responses, conversions, and/or impressions. This total number can then be used to retrieve or compute the overall rank score from the model or lookup table.

The context rank score is a score related to the likelihood of an invitational content resulting in a conversion as compared to other invitational content. Specifically, the content rank score is related to the likelihood of conversion for particular contexts. In some cases, the content rank scores can be separated by behavioral contextual characteristics. For example, a content rank score can be related to the likelihood of conversion with respect to a group of users generally associated with high or low conversion rates. In another example, the content rank score can be related the likelihood of conversion with respect to a group of users generally associated with high or low conversion rates for a specific context.

Thus, the context rank score can be provided by constructing a model or table of values that correlates performance of invitational content, previously presented in a particular context and/or presented to specific groups of users, to specific scores in a range. For example, the previously presented invitational content in the performance history database 224 can be arranged in a table according to the increasing number or rate of responses or conversions in the performance history for a particular context and/or group of users. Thereafter, increasingly larger scores can be associated with the ordered entries in the table. Thus, the context rank score can be obtained by looking up the invitational content of interest in the table and retrieving the associated score. In another example, a model or lookup tables can be generated that associates different score values for different numbers or rates of responses or conversions, depending on the context and/or group of users. Thus, the context rank score can be obtained by retrieving a performance history of an invitational content of interest to obtain some measure of the relative number or rate of conversions or responses for the invitational content as compared to other invitational content. Such a measure can be a total number of responses, conversions, and/or impressions. This total number can then be used to retrieve or compute the context rank score from the model or lookup table.

The covariance score is a score related to the likelihood of an invitational content resulting in at conversion when presented to user based on the performance of invitational content previously presented to the user and other users. More generally, the covariance score can be used to identify invitational content which may be of interest to the user. The covariance score is provided by first generating a covariance matrix that indicates the overall relationship or covariance between different invitational content previously presented to all users based on the performance history. Thereafter, the performance history associated with the requesting user is used to perform lookups against the covariance matrix to determine the covariance score.

For example, the performance history for the requesting user can be analyzed to determine invitational content associated with a response or conversion. Thereafter, if the covariance matrix indicates that there is a strong relationship between an invitational content in the queue and invitational content previously presented to the requesting user and resulting in a response or conversion, a high score can be provided. In contrast, if the covariance matrix indicates that there is a weaker or no relationship between an invitational content in the queue and invitational content previously presented to the requesting user and resulting in a response or conversion, a lower score can be provided. For example, in one configuration, the covariance values for the invitational content in the user performance history can be combined to estimate an overall covariance with the invitational content of interest. Thereafter, based on a model or table, a covariance score can be generated.

In another example, the covariance matrix can be analyzed to determine previously presented content strongly associated with the invitational content in the queue. Thereafter, the performance history for the requesting user can be analyzed to determine whether the requesting user also converted or otherwise responded to such previously presented content. If the requesting user generally converted or responded to such previously presented content, a higher score can be provided. In contrast, if the requesting user generally failed to convert or respond to such previously presented content, a low score can be provided. For example, a score can be generated on the proportion of responses or conversions or any other measure of the requesting user's response to the previously presented invitational content associated with invitational content in queue.

Once the scores described above are computed, these scores can be combined to obtain the queue adjustment factors. In the various embodiments, these scores can be combined in a variety of ways. For example, weights can be defined for each of the scores and the weighted sum of the scores can be used to obtain the queue adjustment factor for an invitational content of interest. In another example, an un-weighted sum (i.e., no weights or weights equal to 1) of these scores can be used to obtain the queue adjustment factors.

In some embodiments, one or more of the scores can be excluded for the queue adjustment factor based on the goal for the invitational content. For example, some advertisers may be more interested in delivering impressions than obtaining conversions for their advertisements. Therefore, content and context rank scores may be irrelevant with respect to determining the basic interest of the user in the products or services being advertised. Accordingly, the queue adjustment factor can be based simply on the covariance score. Accordingly, such a queue adjustment factor is indicative of the basic interest of the user in the goods in services in the advertisement, based on the user's past performance and the relationship with different invitational content.

Referring back to FIG. 3, once the queue adjustment factors the invitational content in the queue are computed at step 312, the order of the queue for the user can be adjusted at step 314. For example, the queue processing module 222 can provide an adjusted queue, specifically tailored for the user associated with the requesting user terminal and the context associated with the request, at step 314. Thereafter, at step 316, the content management module 208 can assemble the content package for the requesting user terminal, where the invitational content is selected from the adjusted queue. Method 300 can then resume previous processing at step 318, including repeating method 300.

In the systems and methods and methods described above, the queue processing module 222, the history database 224, and the update module 226 are shown to be incorporated into content delivery system 206, as shown in FIG. 2. However, in other embodiments, one or more of these components may be deployed at different locations in system 200. For example, queue processing module 222, the history database 224 and the update module 226 can be part of a separate queue reordering system or service communicatively coupled to content delivery system 206. Operation of such a configuration is illustrated in FIG. 4.

Figure 4:
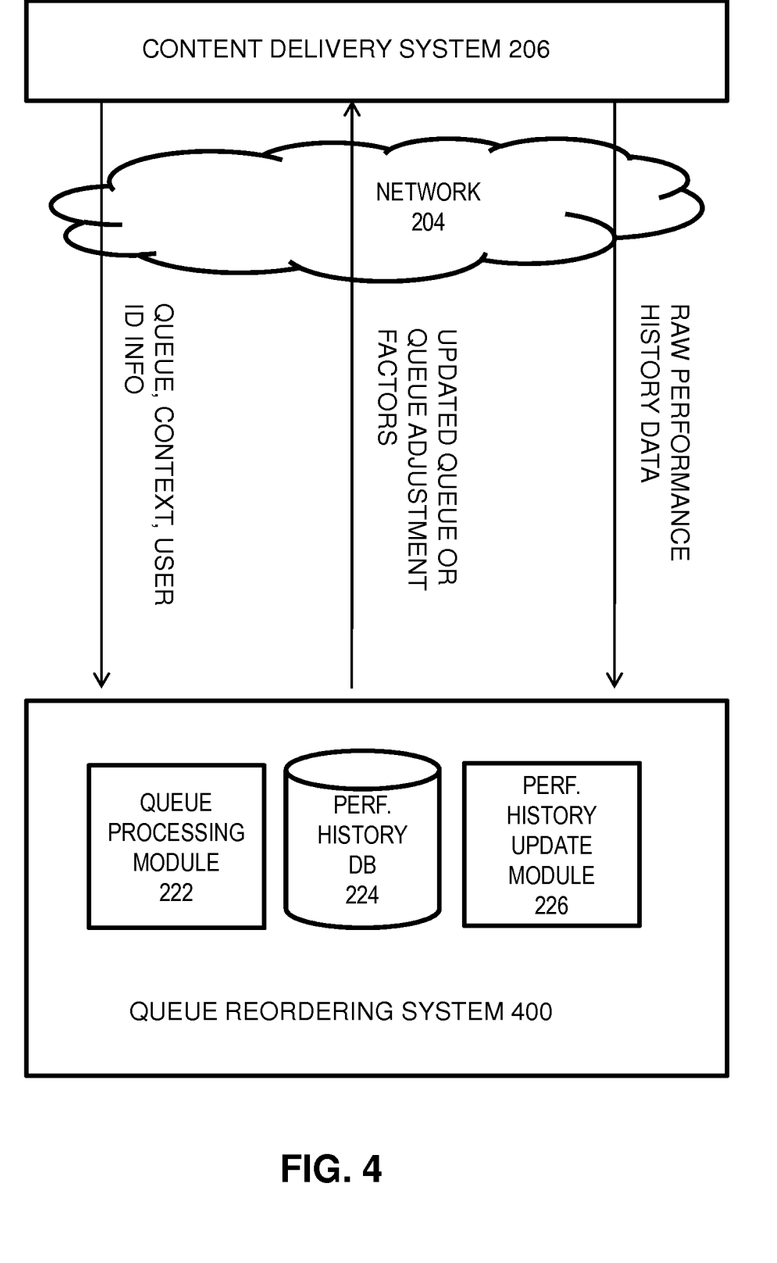
FIG. 4 illustrates an alternate exemplary system embodiment.

FIG. 4 is a schematic diagram of operation an exemplary queue reordering system 400 communicatively coupled to content delivery system 206. Such coupling can be via network 204 or some other communications link. As shown in FIG. 4, the queue reordering system 400 includes queue processing module 222, history database 224, and update module 226. Operation of these components is substantially similar to that described above for FIG. 2. Referring back to FIG. 4, the content delivery system 206 obtains a queue of available content for a request, contextual characteristic associated with the request, and identity information for a user associated with the request. This obtained data can then be forwarded to reordering system 400. As described above, the queue processing module 222 can be configured to generate an updated queue for the content delivery system 206 that is user and context specific. However, in some embodiments, the queue reordering system 400 can simply generate and forward the queue adjustment factors to the content delivery system. Thereafter, the content delivery system 206 can adjust the queue stored therein.

During, before, and after such processes, the content delivery system 206 can be configured to forward raw performance history data to the queue reordering system 400. Such a process can occur as a continuous background process, allowing the update module 226 to continuously update the history database 224. Alternatively, the update module 226 can request the raw data as needed or according to a pre-defined schedule. Further, although the update module 226 and the history database 224 are shown as being incorporated in to system 400, these components can be deployed in separate systems as queue processing module 222.

As shown above, the systems and method described herein provide a means for delivering targeted invitational content to requesting users. However, the reverse occurs. That is, the systems and methods described herein also provide an identification of an audience for specific types of invitational content. That is, the systems and methods described herein are essentially generating leads and identifying potential customers for the goods and services. Accordingly, a bidding or premium pricing process can be used in conjunction with the various method described above to generate additional revenues for an operator of a content delivery system. Accordingly, referring back to FIG. 2, the content delivery system 206 can further include a bid/pricing engine 228 for facilitating such processes. In such cases, the content management module 208 is configured to select content using the engine 228 and the updated queue. That is, rather than automatically assemble a next content package by selecting invitational content based on the updated queue and thereafter providing billing according to the agreement between the primary and secondary providers, the engine 228 can identify such a presentation as having a higher value. Thus, the engine 228 can configured to change the pricing for delivery of the selected invitational content in the content package for the requesting user. In some configurations, the one of the secondary content providers 202 associated with the selected invitational content can be provided the opportunity to reject or accept the premium pricing. In such instances, the content management module 208 can be configured to select a next invitational content from the queue if the premium pricing is rejected.

Alternatively, the engine 228 can send a request for bids to the various content providers offering the same goods or services and selected the invitational content for the content package from the highest bidding content provider. Thus, the engine 228 facilitates the generation of additional revenue for the content delivery system 206.

In the various embodiments, content delivery system 206 can be configured to permit users to adjust the operation and configuration of the various components of content delivery system 206. Accordingly, a user interface can be provided for communicating with a user interface (UI) module 230 for performing such tasks. Further, the UI module 230 can be configured to provide different levels of access based on authenticating different types of users. For example, administrative users can utilize the user interface and UI module 230 for specifying and/or modifying information regarding the primary content providers 210, the secondary content providers 214, user terminals 202, and end users. Administrative users can also utilize the user interface and UI module 230 for specifying operating parameters for the various interfaces, modules, engines, or databases of content delivery system 206. Further, administrative users can also utilize the user interface and UI module 230 for manually or directly adjusting any of the entries in the databases of content delivery system 206.

In addition to providing access to administrative users, the user interface and UI module 230 can also be configured to provide access to end users associated with primary content providers 210 and end users associated with secondary content providers. In the case of end users associated with primary content providers 210, the user interface and UI module 230 can be configured to allow such end users to, for example, update existing content from primary content providers 210 with the content delivery system 206, register new content or new primary content providers with the content delivery system 206, and/or specify preferences for selecting content from secondary content providers 214. In another example, the user interface and UI module 230 can include analysis tools for evaluating performance of content from the primary content providers 210, such as the performance of content with respect to the user terminals and/or content from the secondary content providers 214. In the case of end users associated with secondary content providers 214, the user interface and UI module 230 can be configured to allow these end users to, for example, update existing content from secondary content providers 214 with the content delivery system 206, register new content or new secondary content providers with the content delivery system 206, or specify preferences for selecting primary content providers 214. In another example, the user interface and UI module 230 can include analysis tools for evaluating performance of content from the secondary content providers 214, such as the performance of content with respect to the user terminals 202 and/or content from the primary content providers 210.

In the various embodiments, the user interface for the UI module 230 can be accessed via an end user terminal in communication with the content delivery system 206. For example, the end user terminal can be one of user terminals 202, a user interface device associated with any of content providers 210 and 214, or any user interface device or system locally or remotely connected to content delivery system 206. The user interface and UI module 230 can be configured to operate in a variety of client modes, including a fat client mode, a thin client mode, or a hybrid client mode, depending on the storage and processing capabilities of the content delivery system 206 and/or the end user terminal. Therefore, a user interface for UI module 230 can be implemented as a standalone application operating at the end user terminal in some embodiments. In other embodiments, web browser-based portal can also be used to provide the user interface for UI module 230. Any other configuration to remotely or locally accessing content delivery system 206 can also be used in the various embodiments.

Although the user interface and UI interface 230 are described above as providing specific types of functionality for specific types of end users, the user interface and UI module 230 can also be configured to allow other interactions between end users and the content delivery system 206. For example, the user interface and UI module 230 can be used to specify any of the parameters, weights, or any other variables for the systems and methods described herein. In another example, the user interface can also be user to view, analyze, and/or modify any final or intermediate results or data generated by any of the systems and methods described herein. In yet another example, the user interface and UI module 230 can also provide a reporting/analysis interface area designed for mining/analyzing performance of content from the secondary providers in terms of CTR, eCPM, cost measures, revenue measures, etc. Additionally, UI module 230 can be configured to sends notifications and alerts to users associated with primary content providers 210 (via email, messaging, etc.) when a campaign runs low, a budget runs low, or any other event of interest occurs. Additionally, the UI module 230 can also send daily/weekly/monthly reports of campaign delivery performance and suggestions for optimization to the content providers 210 and 214.

Other implementations according to these examples include non-transitory computer-readable media for carrying or having computer-executable instructions or data structures stored thereon. Such computer-readable media can be any available media that can be accessed by a general purpose or special purpose computer. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed as limiting. Those skilled in the art may recognize various modifications and changes that may be made while following the example embodiments and applications illustrated and described herein, and without departing from the true spirit and scope of the present disclosure.

The invention claimed is:

1. A method, comprising:
   receiving a request for an internet content package designed to include instructions for presenting content from the content package in a user interface, the request associated with one of a plurality of users and one or more user contextual characteristics, wherein user contextual characteristics include at least one of channel characteristics, demographic characteristics, behavioral characteristics, or spatial-temporal characteristics;
   calculating queue adjustment factors for a queue of available invitational content items, each invitational content item in the queue of available invitational content items being at least one of propaganda or inducements and each invitational content item having a queue adjustment factor specifying a value for adjusting a position of the invitational content item within the queue, wherein the calculating is based on a weighted combination of an overall rank score, a context score, and a covariance score for the invitational content item, wherein an overall rank score specifies an overall performance of the invitational content item with respect to other invitational content items previously presented to the plurality of users, a context score specifies a performance of the invitational content item in a context of the request with respect to other invitational content previously presented to the plurality of users in a context, and a covariance score specifies an interest in the invitational content item based on a correlation between a behavior of the plurality of users and the one user with respect to previously presented invitational content, and further wherein the weighted combination is based on a goal for the invitational content item;
   adjusting positions of the available invitational content items within the queue of available invitational content items based on the calculated queue adjustment factors;
   assembling, via a processor, the content package for the one of the plurality of users, the content package comprising at least one of the available invitational content items selected according to the adjusted queue; and
   transmitting via a network the assembled content package for presentation to the requesting one of the plurality of users.

2. The method of claim 1, wherein calculating the queue adjustment factors further comprises:
   calculating a plurality of covariance values based on the performance history of the invitational content previously presented to the plurality of users;
   computing the covariance scores for the available invitational content based on a portion of the plurality of covariance values associated with invitational content previously presented to the one of the plurality of users.

3. The method of claim 1, wherein calculating the adjustment factors further comprises:
   obtaining a performance ranking of the invitational content previously presented to the plurality of users based on the performance history; and
   calculating the overall rank scores for at least a portion of the available invitational content based on the performance ranking.

4. The method of claim 1, wherein calculating the queue adjustment factors further comprises:
   obtaining a performance ranking of the invitational content previously presented to the plurality of users based on the performance history for a context having the contextual characteristics associated with the request;

calculating the context rank scores for at least a portion of the available invitational content based on the performance ranking.

5. The method of claim 1, wherein the weighted combination comprises a weighted sum.

6. A non-transitory computer-readable medium having code for causing a computer to perform a method stored thereon, the method comprising:

receiving a request for an internet content package, the request associated with one of a plurality of users;

identifying user contextual characteristics for the internet content package to be delivered to the one of the plurality of users, the content package including instructions for presenting content from the content package in a user interface, and wherein user contextual characteristics include at least one of channel characteristics, demographic characteristics, behavioral characteristics, or spatial-temporal characteristics;

calculating queue adjustment factors for a queue of available invitational content items, each invitational content item in the queue of available invitational content items being at least one of propaganda or inducements and each invitational content item having a queue adjustment factor specifying a value for adjusting a position of the invitational content item within the queue, wherein the calculating is based on a weighted combination of an overall rank score, a context score, and a covariance score for the invitational content item, wherein an overall rank score specifies an overall performance of the invitational content item with respect to other invitational content items previously presented to the plurality of users, a context score specifies a performance of the invitational content item in a context of the request with respect to other invitational content previously presented to the plurality of users in a context, and a covariance score specifies an interest in the invitational content item based on a correlation between a behavior of the plurality of users and the one user with respect to previously presented invitational content, and further wherein the weighted combination is based on a goal for the invitational content item;

adjusting positions of the available invitational content items within the queue of available invitational content items associated with the contextual characteristics based on the calculated queue adjustment factors; and assembling the content package for the one of the plurality of users, the content package comprising at least one of the available invitational content items selected according to the adjusted queue; and transmitting via a network the assembled content package for presenting to the requesting one of the plurality of users.

7. The computer-readable medium of claim 6, wherein the step of calculating further comprises computing the overall rank score, the computing comprising:

obtaining a ranking for invitational content previously presented to the plurality of users based on a performance history for the invitational content previously presented to the plurality of users; and calculating the overall rank score for at least a portion of the available invitational content based on the performance ranking.

8. The computer-readable medium of claim 6, wherein the step of calculating further comprises computing the context rank score, the computing comprising:

obtaining a performance ranking for the invitational content previously presented to the plurality of users in a content associated with the contextual characteristics, the ranking based on a performance history for the invitational content previously presented to the plurality of users;

calculating the context rank score for at least a portion of the available invitational content based on the ranking.

9. The computer-readable medium of claim 6, wherein the step of calculating further comprises computing the covariance score, the computing comprising:

calculating a plurality of covariance values based on a performance history of the invitational content previously presented to the plurality of users;

computing the plurality of covariance scores for the available invitational content based on a portion of the plurality of covariance values associated with invitational content previously presented to the one of the plurality of users.

10. A content delivery system, comprising:

a communications interface for receiving requests for internet content packages from one or more user terminals, a content package including instructions for presenting content from the content package in a user interface; a storage element for storing at least one queue of available invitational content items; and a processing element communicatively coupled to the communications interface and the storage element, wherein responsive to the communication interface receiving a new request, the processing element is configured for:

identifying a one of a plurality of users associated with the new request and one or more user contextual characteristics, wherein user contextual characteristics include at least one of channel characteristics, demographic characteristics, behavioral characteristics, or spatial-temporal characteristics, computing queue adjustment factors for the available invitational content items, each invitational content item in the queue of available invitational content items being at least one of propaganda or inducements and each invitational content item having a queue adjustment factor specifying a value for adjusting a position of the invitational content item within the queue, wherein the computing is based on a weighted combination of overall rank scores, context scores, and covariance scores for invitational content previously presented at the user terminals, wherein an overall rank score specifies an overall performance of the invitational content item with respect to other invitational content items previously presented to the plurality of users, a context score specifies a performance of the invitational content item in a context of the request with respect to other invitational content previously presented to the plurality of users in a context, and a covariance score specifies an interest in the invitational content item based on a correlation between a behavior of the plurality of users and the one user with respect to previously presented invitational content, and further wherein the weighted combination is based on a goal for the invitational content item, generating an adjusted queue for the identified user from the stored queue based on the queue adjustment factors by adjusting positions of the available invitational content items within the queue, assembling a content package for the identified user, the content package comprising at least a portion of the available invitational content items selected based on the adjusted queue, and transmitting via a network the assembled content package for presentation to the one of the plurality of users.

11. The system of claim 10, wherein the weighted combinations are weighted sums of the overall rank scores, the context rank scores, and the covariance scores.

12. The system of claim 10, wherein the processing element is further configured for:
    obtaining a performance ranking of the invitational content previously presented to the plurality of users based on the performance history; and
    calculating the overall rank scores for at least a portion of the available invitational content in the stored queue based on the performance ranking.

13. The system of claim 10, wherein the processing element is further configured for:
    obtaining a performance ranking of the invitational content previously presented to the plurality of users based on the performance history for a context having the contextual characteristics for the content package; and
    calculating the context rank scores for at least a portion of the available invitational content in the stored queue based on the performance ranking.

14. The system of claim 10, wherein the processing element is further configured for:
    calculating a plurality of covariance values based on the performance history of the invitational content previously presented to the plurality of users; and
    computing the plurality of covariance scores for available invitational content in the stored queue based on a portion of the plurality of covariance values associated with a plurality of invitational content previously presented to the one of the plurality of users.

15. The system of claim 10, wherein the processing element is further configured for:
    prior to assembling the content package, generating an alternate pricing for the selected portion of the available invitational content.

16. The system of claim 10, wherein the processing element is further configured for:
    prior to assembling the content package, identifying a first portion of the available invitational content according to the adjusted queue, identifying at least a second portion of the available invitational content at least partially related to the first portion, obtaining bids associated with the first and second portions of the available content, and identifying as a selected portion of the available invitational content for the content package at one of the first and second portions of the available content associated with a higher bid.

* * * * *